Nov. 7, 1961  J. S. ABMA ET AL  3,007,259
OPTOPHONE
Filed March 9, 1960
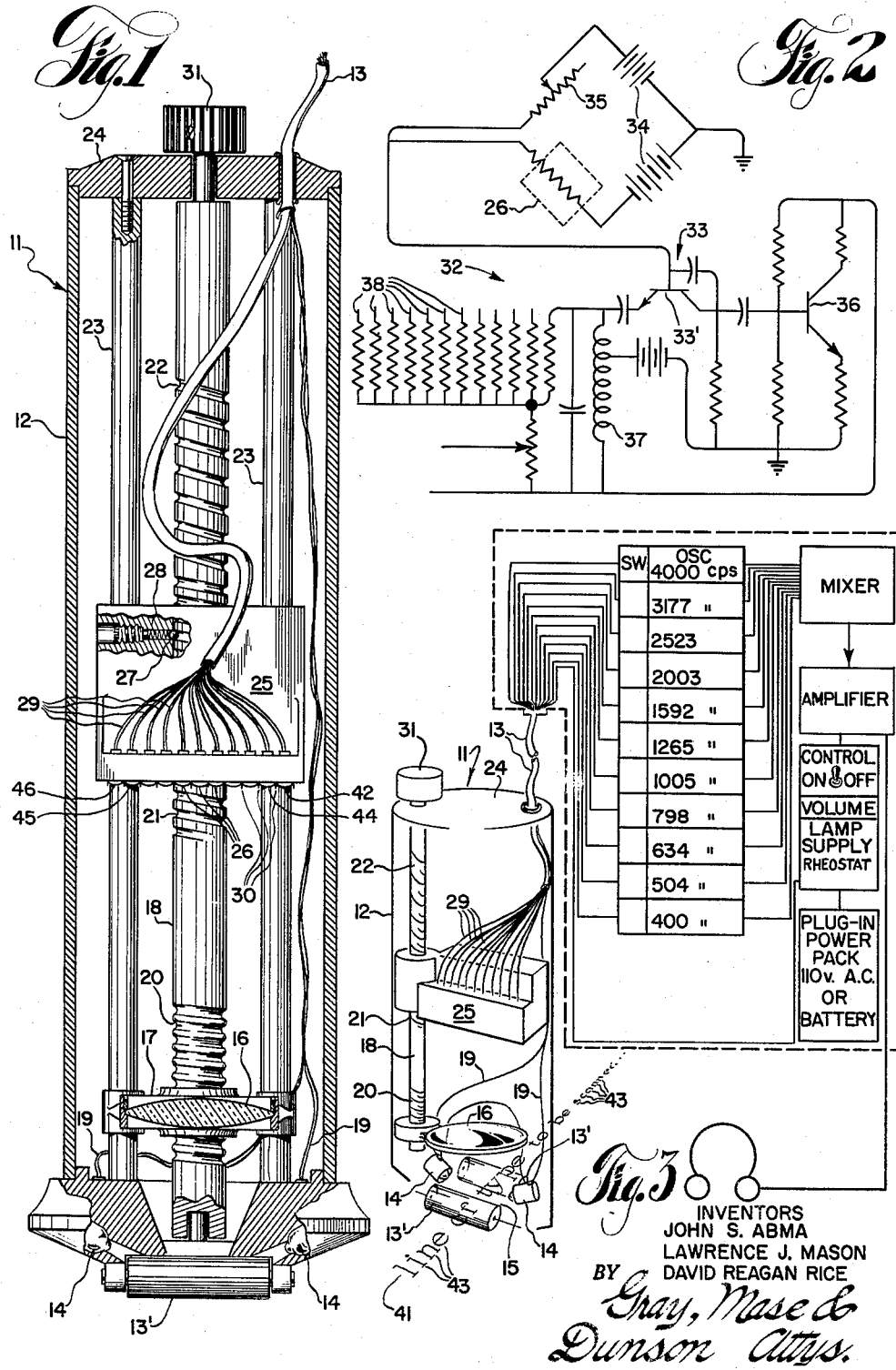
INVENTORS
JOHN S. ABMA
LAWRENCE J. MASON
DAVID REAGAN RICE
BY
Gray, Mase & Dunson Attys.

United States Patent Office 3,007,259
Patented Nov. 7, 1961

3,007,259
OPTOPHONE
John S. Abma, Columbus, and Lawrence J. Mason, Worthington, Ohio, and David Reagan Rice, Chatham, N.J., assignors to Battelle Memorial Institute, Columbus, Ohio, a corporation of Ohio
Filed Mar. 9, 1960, Ser. No. 13,799
1 Claim. (Cl. 35—35)

This invention relates to reading devices for the blind. More particularly, it relates to an instrument which transforms ordinary printed matter into recognizable auditory signals.

Aural reading machines (often called optophones) are relatively well known in the art. Conventionally, such devices comprise a pickup for scanning a line of printed material and associated means for transforming light into sounds, which the operator learns to recognize and associate with the letters of the alphabet. The use of such devices has not been as widespread as the need should be for a machine of this type. Some of this lack of the popularity of conventional devices is due to cost, difficulty of learning the use of the reading machine, lack of perceptive quality, limitation of the device to a specified size of print or change in signal code for each size of print, and difficulties in keeping the pickup alined on the printing while scanning a line of print or type. For purposes of this description "printed material" is used to mean ordinary print, type material or even hand printed material.

An advantage of the present reading machine is that it permits the operator to manually guide the pickup in a straight path, as the pickup is used to scan a page of printed material, thus keeping the pickup alined with the area that is to be read. Another advantage is that the reading machine can be used on different sizes of print or type within reasonable limits, making available to the reader a wider selection of readable material.

Briefly, a preferred embodiment of this invention comprises a reading probe and a carrying case containing controls, oscillators, amplifier and power unit. The area to be read is illuminated by small medical-type lens-end lamps located a short distance from the reading material at the end of the probe. The intensity of the lamps is controlled by a rheostat. A lens also near the probe tip projects a magnified image of a portion of the letter being read upon a linear array of photoconductors mounted in the body of the reading probe. Variable magnification is possible by a provision for adjustment in the distances between the print, lens, and photocells, thus allowing for variations in the size of the print. The portion of the letter image is focused on the photocells so that the image is spread over all of the photocells except the two end photocells. These two photocells are used for tracking purposes, by creating an audio signal different from the ordinary reading audio signal if the probe is placed above or below the printed line, or if, during tracking, it begins to stray from the printed line. The probe moves on rollers placed at the tip of the probe. The axis of the rollers is perpendicular to the tracking line, thus aiding the operator to keep the probe alined on the line of print or type. Each photocell picks up a certain part of the black area making up a letter and is connected to, and controls, a separate oscillator located in the carrying case. The photocells cause their associated oscillators to produce tones whenever letter segments are present. Depending upon the number of photocells covered, the letters will be translated into a number of tones as the black areas of the letter are encountered. For example, a lower case "l" may give rise to a number of tones simultaneously, whereas a dash or hyphen would give rise to a single tone.

A further advantage of this invention is the consistency of the code, or audio signals, even though print size of the material may not be the same for different reading selections thus allowing the blind person to learn to use the instrument more rapidly and to have a wide choice of reading material.

In the drawings:

FIG. 1 is a partly sectional elevational view of a typical probe;

FIG. 2 is a circuit diagram of a typical oscillator and photocell switching circuit; and FIG. 3 is a schematic diagram of a reading machine in accordance with this invention.

As shown in FIGS. 1 and 3, the various parts of the pickup or probe 11 are contained in a lightweight casing 12. A multiple conductor flexible cable 13 provides the necessary connection between the probe 11 and the control box. At the end of the probe 11, two cylindrical rollers 13'—13' are mounted with their axes perpendicular to the printed line. Two small lens-end lamps 14—14 are also mounted at the end of the probe 11, so as to illuminate the space 15 between the rollers 13'—13'. Preferably the lamps 14—14 are mounted alongside the probe lens 16 so that one lamp is above and the other is below the letters when the probe 11 is in the correct position for reading. Two electrical conductors 19—19 are provided to supply the current for the lamps 14—14 and descend from the cable 13 to the lights 14—14 at the tip of the probe. The lens 16 is mounted in a lens holder 17 which is threadedly engaged with a shaft 18. The shaft 18 has three different thread pitches 20, 21, and 22. The lens holder engages thread 20 of threaded shaft 18. Preferably the thread 20 has the finest pitch, thread 22 has the coarsest pitch, while thread 21 is intermediate in pitch to threads 20 and 22. Three frame members 23—23 support and connect the tip of the probe 11 with the cap 24. Slidably mounted on two of these frame members 23—23 and engaged with the shaft 18 is a holder 25 upon which are mounted a linear array of photocells 26—26. Holder 25 engages threads 21 and 22 of shaft 18 by means of a small ball 27 held in position in the threads 21 and 22 by a spring 28. Threads 21 and 22 are connected threads so that the ball 27 may pass between threads 21 and 22 without becoming disengaged. Each photocell 26 is connected to the control box through the cable 13 by means of one of the electrical conductors 29. Insulating plates 30—30 are inserted between adjacent photocells 26—26. Shaft 18 extends through the cap 24 and has a knob 31 for rotating the shaft 18, thus adjusting the distances between the print, lens, and photocells. Adjustment of the distances between print, lens, and photocells adjusts the size of the image on the photocells maintaining approximate focus on the photocells. Since the photocell is actually an area, approximate focus is adequate.

A typical photocell, switch, and oscillator circuit are shown in FIG. 2. A reader with eleven audio channels is preferred from the standpoint of cost and reading quality. However, a different number of audio channels may be used. The oscillators cover a frequency range with logarithmic frequency spacing. In the preferred form of the invention, the eleven oscillators cover a frequency range of 400 to 4000 c.p.s. as shown in FIG. 3.

The photoconductor 26 gates its oscillator 32 by means of a transistor switch 33 placed in the feedback path of the oscillator 32. The resistance of the photoconductor 26 determines the impedance across the emitter-collector terminals of the transistor 33' by controlling the transistor base current. The photocell 26 is one leg of a D.-C. resistance bridge composed of a center-tapped power supply 34, photocell 26, and balancing rheostat 35.

The action of the transistor switch 33 effectively controls the transistor oscillator 32, which is of the conventional Hartley design. The active element is an npn transistor 36 with a stabilized bias circuit. The tank circuit contains an inductor 37 wound on a ferrite core. The size of the air gap in the magnetic circuit and the capacitor in the tank circuit determine the frequency of each oscillator.

The output of each oscillator is taken across the tank circuit. The signals are mixed at a common output potentiometer, which is also the volume-control input to the audio amplifier. To prevent loading down of the tank circuits by the amplifier, a large attenuating resistor 38 is placed at the output of each oscillator. A suitable amplifier may comprise a standard, R-C coupled, three-stage, common emitter circuit (not shown).

It is necessary to obtain an output from the oscillators when the dark image of a letter segment covers the photocells. Therefore, each oscillator is switched on whenever its respective photoconductor's resistance increases. An npn transistor is used in this switching application. Operating the switching transistor with a negative voltage applied to the collector, rather than a normal positive voltage, results in the transistor's having increased operating stability under varying temperature conditions. With the switching transistor connected in this manner, the switch is open when the base is negative with respect to both the emitter and the collector, and closed when the base becomes positive with respect to either the collector or the emitter.

The photoconductor is connected in a voltage-dividing circuit. When an image falls across its sensitive area, resistance and voltage across the photoconductor increase, causing the base voltage of the switching transistor to become more positive than the collector voltage, and closing the switch. The transistor switch is not a perfect switch; that is, it does not have zero resistance when it is in a closed position, nor does it have infinite resistance when it is in the open position. Therefore, if the transistor switch is placed in the output circuit of the oscillators, there is always some signal passing through the switch even when it is open. Because of this, a transistor switch is not used to control directly the output of the oscillators. Instead, transistor switching of the oscillator is accomplished by inserting the transistor in the feedback path of the oscillator. The high impedance of the transistor switch when it is in the open position is sufficient to stop the oscillations. When the oscillator is adjusted correctly, it turns completely on or off in two to three milliseconds.

Mixing of the oscillator outputs is accomplished by a voltage-divider network, the output resistor of which is common to all oscillator circuits. The decoupling resistors associated with each oscillator compensate for the nonlinear frequency response of the earphones, producing a flat audio output.

The output signals of the oscillators are attenuated by the mixing circuit and need amplification. Therefore, a three stage amplifier with a large amount negative feedback is used before the signal reaches the earphones.

The oscillator and switching circuits are similar in appearance and size and may be built as individual printed circuits. The audio amplifier circuit may also be a printed circuit. Either a battery power supply or an A-C unit may be used to power the instrument.

*Operation*

Referring to FIGS. 1 and 3, the probe is placed on a line of type 41. Assuming, for purposes of explanation, that the probe contains a linear array of eleven photocells 26, if the probe is above the line of type 41, the lower end photocell 42 encounters black areas and a distinguishable signal is heard. The structure of the device may be arranged so that the bottoms of the letters 43 are focused on the photocell 45 controlling the next to the lowest frequency oscillator, and the top of the letter 43 is focused on the photocell 44 controlling the next to the highest frequency oscillator. Much of the time the photocells for detecting the very bottoms of the letters will not be activated since these photocells will be required to detect the descending portions of letters such as the bottoms of such letters as g, y, and j. The photocells 42 and 46 controlling the highest and lowest frequency oscillators respectively would be used for detecting whether the probe 11 had been misplaced on the line of printed material. If the probe 11 were placed too high on the page so that the "descenders" of such letters as g, y, and j formed an image on photocell 46, the lowest signal would be emitted by the machine; and conversely, if the probe 11 were placed too low on the page so that the tops of the capital letters and l's formed an image on photocell 42, the highest signal would be emitted by the machine. The photocell in the linear array that detects the "base" of the letters will be heard each time a letter is encountered. That is, all the letters of the alphabet have a black area that falls on a line drawn horizontally across the page and the photocell that detects this "level" of the black image will emit a signal each time a letter is read. After the user has had a little experience with the probe 11, the presence or absence of this signal will also aid in determining probe alignment with the line of printed material. By selecting an arrangement of parts of the device which makes low and high frequencies correspond to low and high black areas of the print 41, a quick association is supplied for the operator to begin learning. The operator makes further use of each of the end photocells 42 and 46 in determining whether the instrument is correctly adjusted for the size print being read.

The lights 14—14 at the tip of the probe 11 are directed so that the print 41 is illuminated by an elongated spot of light. The light intensity is controlled by a rheostat on the control box. The light control not only compensates for changes in photocell resistance due to different magnification levels and different kinds of printed material but it is also used to compensate for photoconductor resistance changes due to temperature. The image is focused on the photocells 26 by the lens 16. By turning the knob 31 the operator compensates for different sizes of print. The range of print size encompassed by a probe 11 depends upon the changes in distance that can be made between print 41, lens 16, and photocells 26 and also determines the ultimate length of the probe 11. After the probe has been alined on the line of type 41 and the operator begins scanning the line, the cylindrical rollers 13'—13' keep the probe 11 traveling in a straight line; that is, if the operator unknowingly pushes the probe 11 in a manner that would result in an irregular track, since rolling friction is less than sliding friction, the probe resists the forces which urge its deviation from a straight path. The rollers 13'—13' in addition to producing the straight-line path while reading also keep the proper magnification by maintaining a constant print to lens distance after the lens 16 has been adjusted by the knob 31. Further the rollers 13'—13' contact the page of printed matter and provide a constant angular relationship between the plane of the page and the long axis of the probe 11. In the embodiment of the probe 11 shown in the drawings, this angular relationship is perpendicular.

The image of the black areas of the letters on the page is projected on to the linear array of photocells. The resistance of the photocell increases, tripping the switching transistor and activating the oscillator. The tone is amplified and sent to the earphones, where the reader then interprets from the tone or mixture of tones the heights and locations of the black areas on the line. With practice, the operator learns to recognize the signal groups of the letters and can read ordinary print.

It will be understood of course, that, while the form of the invention herein shown and described, constitutes a preferred embodiment, it is not intended to illustrate all possible forms or ramifications of the invention. It will also be understood that the words used are words of description rather than words of limitation and that various changes, such as changes in shape, size and arrangement of parts may be made without departing from the spirit and scope of the invention herein disclosed.

What is claimed is:

Apparatus for transforming printed material into sounds including a probe electrically connected to a plurality of audio oscillators and an amplifier for increasing the output of said audio oscillators, comprising: a lens in the tip of said probe; two cylindrical rollers at the tip of said probe mounted with their axes parallel to each other and positioned to roll along a line of printed material; at least one lamp mounted at the tip of said probe positioned to illuminate the printed material in the space between said rollers; a plurality of photocells in said probe spaced from said lens; said lens and said photocells being engaged with a threaded shaft with said lens threadedly engaged with a fine thread on said shaft and said photocells threadedly engageable in sequence with two series of coarse threads on said threaded shaft; said shaft being rotatably mounted so that rotation of said shaft spaces said lens and said photocells to adjust for different sizes of printed material; a switching transistor in the feed-back path of each of said audio oscillators; a photocell bridge for producing positive base current with respect to the collector of said switching transistor causing said switching transistor to effectively complete the circuit of the feed-back path of the oscillator.

References Cited in the file of this patent

Freiberger, Howard: "Reading Machines for the Blind," Summary of a Working Level Conference for Veterans' Administration Contractors held at Haskins Laboratories, N.Y.C., on June 10, 1958. (Pub.: Research and Devel. Div., U.S. Vet. Admin., N.Y.C.).

Lipton, Arthur: Abstract dated June 30, 1958, based upon Final Report on the Development and Evaluation of Aural Reading Devices for the Blind to Veterans' Administration.

Lipton, Arthur, et al.: Summary of Fifth Technical Session on Reading Machines for the Blind held at the National Academy of Sciences, Wash., D.C., on September 17, 1958.